(12) United States Patent
Williams

(10) Patent No.: US 8,319,771 B2
(45) Date of Patent: Nov. 27, 2012

(54) COMPUTER MODELLED ENVIRONMENT

(75) Inventor: Phillip Williams, Brighton (GB)

(73) Assignee: Disney Enterprises, Inc., Burbank, CA (US)

( * ) Notice: Subject to any disclaimer, the term of this patent is extended or adjusted under 35 U.S.C. 154(b) by 1017 days.

(21) Appl. No.: 12/242,029

(22) Filed: Sep. 30, 2008

(65) Prior Publication Data
US 2010/0079447 A1    Apr. 1, 2010

(51) Int. Cl.
G06T 15/00    (2011.01)
(52) U.S. Cl. ......... 345/419; 345/423; 345/426; 345/589
(58) Field of Classification Search .................. 345/419, 345/423, 426, 589
See application file for complete search history.

(56) References Cited

U.S. PATENT DOCUMENTS

| | | | | |
|---|---|---|---|---|
| 5,971,852 A * | 10/1999 | Itai et al. | | 463/31 |
| 6,184,857 B1 * | 2/2001 | Latham | | 345/589 |
| 6,570,569 B1 * | 5/2003 | Tsukamoto et al. | | 345/473 |
| 6,778,948 B1 * | 8/2004 | Kanetaka et al. | | 703/22 |
| 7,365,744 B2 * | 4/2008 | Fang et al. | | 345/423 |
| 7,372,472 B1 * | 5/2008 | Bordeleau et al. | | 345/619 |
| 7,557,808 B2 * | 7/2009 | Yamamoto et al. | | 345/474 |
| 7,864,181 B1 * | 1/2011 | Baraff | | 345/475 |
| 8,009,168 B2 * | 8/2011 | Zhou et al. | | 345/426 |

OTHER PUBLICATIONS

Staubli et al, Volume Rendering of Smoke Propagation CFD data, IEEE Visualization, Oct. 2005, pp. 335-341.*
Dong et al, Smoke Simulation Based on Particle System in Virtual Environments, Multimedia Communications, Aug. 2010, pp. 42-44.*
Wei et al, Simulating Fire with texture Splats, Proceedings of the conference on Visualization, Oct. 2002, pp. 1-8.*
Somasekaran, Using Particle Systems to Simulate Realtime Fire, The University of Western Australia, 2005, pp. 1-64.*

* cited by examiner

Primary Examiner — Phu K Nguyen
(74) Attorney, Agent, or Firm — Marsh Fischmann & Breyfogle LLP; Kent A. Lembke

(57) ABSTRACT

A computer-readable storage medium that includes a computer program and corresponding method, the program comprising code which will: generate a computer-modelled environment comprising a three-dimensional computer-modelled space and one or more three-dimensional computer-modelled objects within that space; and generate a map of values of a kinetic parameter over the object's surface, the kinetic parameter parameterizing a kinetic activity to be modelled to occur within the computer-modelled space in relation to that surface.

38 Claims, 6 Drawing Sheets

COMPUTER MODELLED ENVIRONMENT

BACKGROUND OF THE INVENTION

1. Field of the Invention

The present invention relates to the modelling of activity in a computer-modelled environment.

2. Description of the Related Art

Computer games can be played on a number of different types of computer terminal such as a personal computer, specialized games console or even a mobile phone. A typical game involves interaction between an end user and a game world, which is a computer modelled environment comprising a computer-modelled space and computer-modelled objects within that space. The computer-modelled space is effectively a coordinate system within which the computer-modelled objects may extend, move, and be related to one another. In typical modern games, the coordinate system and objects are usually three-dimensional.

In creating a computer game world or other computer-modelled environment, it is desirable that the graphics should be as realistic as possible so that the end-user will feel immersed in that environment. This involves ensuring the realism of not only the immediate, static appearance of objects in that environment, but also the behaviour of activity occurring in relation to those objects, i.e. how things move or change. In the case of a game, the activity could occur either in response to stimulus from the end-user or autonomously.

One such type of activity is the emission of particles from a surface of a computer-modelled object. This may be used for example to model explosions or smoke.

The current technique for emitting particles from a surface is to place a plurality of discrete "emitters" over that surface. An emitter is a dedicated point element within the model, from which one or more particles are emitted.

For instance, in the example shown in FIG. 1a, an explosion is to be modelled to occur from within a building 2. The modelled building 2 comprises a plurality of windows 4 which are defined by portions of the surface of the building 2. To simulate the explosion, a plurality of smoke or dust particles is to be emitted from the windows 4. Therefore, a plurality of emitters 6 is laid down on the portions of the building's surface defining the windows 4. Each emitter 6 emits one or more particles, which represent the dust or smoke particles or such like.

However, in order to achieve a realistic effect, the emitters 6 must each be placed individually in a realistic pattern by the designer who is creating the model (no particular pattern is shown explicitly in FIG. 1a, but it will be understood that this figure is just schematic). This technique is highly time consuming for the designer.

The emitters 6 could instead be placed at random over each window, but that would not create a very realistic effect.

An alternative technique is to place a single emitter 6' inside the modelled building 2, then emit many particles from that emitter 6' and calculate for each one where the particle would strike the interior of the building 2 and where it would pass through a window 4. This is shown schematically in the side-on view of FIG. 1b. However, this technique incurs a high processing cost, i.e. requires many processing cycles.

Similar difficulties may be encountered when modelling other kinetic properties of a surface. For example, a surface may be modelled to have a material property defining how that surface deforms in response to impacts, but manually specifying the variations in that material property over the surface may be time consuming for the designer.

It is desirable to find an improved technique for modelling kinetic activity such as particle emission or the like occurring in relation to surfaces of computer-modelled objects.

SUMMARY OF THE INVENTION

According to one aspect of the present invention, there is provided a computer-readable storage medium having stored therein a computer program comprising code which when executed on a computer will: generate a computer-modelled environment comprising a three-dimensional computer-modelled space and one or more three-dimensional computer-modelled objects within said space; generate a visual texture map for application to a surface of one of said computer-modelled objects, the visual texture map defining differing values of a visual parameter over said surface; and generate a kinetic map by correlating values of a kinetic parameter to the values of said visual parameter at corresponding locations over said surface, the kinetic parameter parameterizing a kinetic activity to be modelled to occur within said computer-modelled space in relation to said surface.

For example, the kinetic parameter may parameterize an emission of particles from the respective locations of said surface. The kinetic parameter may specify speeds of the particles modelled as being emitted from the respective locations of said surface. The kinetic parameter may specify a lifetime of a particle to be ejected from said surface. The kinetic parameter may specify one of the density, the frequency and the probability of a particle being ejected from said surface.

In another example, the kinetic parameter may be a modelled material property of said surface, the material property parameterizing how said surface will react to impacts occurring within said computer modelled environment at the respective locations of said surface.

By re-using an existing texture created for visual purposes to also map variations in a kinetic parameter such as particle speed over an object's surface, then a realistic behaviour can be created without laborious manual placement of multiple dedicated, discrete elements such as multiple particle emitters.

According to another aspect of the present invention, there is provided a computer-readable storage medium having stored therein a computer program comprising code which when executed on a computer will: generate a computer-modelled environment comprising a three-dimensional computer-modelled space and one or more three-dimensional computer-modelled objects within said space; generate a visual texture map for application to a surface of one of said computer-modelled objects, the visual texture map defining differing values of a visual parameter over said surface; and generate a particle-speed map by correlating values of particle speed to the values of said visual parameter at corresponding locations over said surface, the particle speed values specifying the speed of particles modelled to be ejected from the respective locations of said surface within said computer-modelled space.

According to another aspect of the present invention, there is provided a computer-readable storage medium having stored therein a computer program comprising code which when executed on a computer will: generate a computer modelled environment comprising a three-dimensional computer-modelled space and one or more computer three-dimensional computer-modelled objects; and generate a non-visual texture map mapping a speed value over a continuous portion of a surface of one of said computer-modelled object, the speed value specifying the speed of emitted particles.

The texture map may be a procedural texture map or an artist-generated texture map.

According to another aspect of the present invention, there is provided a computer-implemented method comprising: generating a computer-modelled environment comprising a three-dimensional computer-modelled space and one or more three-dimensional computer-modelled objects within said space; generating a visual texture map for application to a surface of one of said computer-modelled objects, the visual texture map defining differing values of a visual parameter over said surface; and generating a kinetic map by correlating values of a kinetic parameter to the values of said visual parameter at corresponding locations over said surface, the kinetic parameter parameterizing a kinetic activity to be modelled to occur within said computer-modelled space in relation to said surface.

According to another aspect of the present invention, there is provided a computer-implemented method comprising: generating a computer-modelled environment comprising a three-dimensional computer-modelled space and one or more three-dimensional computer-modelled objects within said space; generating a visual texture map for application to a surface of one of said computer-modelled objects, the visual texture map defining differing values of a visual parameter over said surface and generating a particle-speed map by correlating values of particle speed to the values of said visual parameter at corresponding locations over said surface, the particle speed values specifying the speed of particles modelled to be ejected from the respective locations of said surface within said computer-modelled space.

According to another aspect of the present invention, there is provided a computer-implemented method comprising: generating a computer modelled environment comprising a three-dimensional computer-modelled space and one or more computer three-dimensional computer-modelled objects; and generating a non-visual texture map mapping a speed value over a continuous portion of a surface of one of said computer-modelled object, the speed value specifying the speed of emitted particles.

BRIEF DESCRIPTION OF THE FIGURES

For a better understanding of the present invention and to show how it may be carried into effect, reference will now be made by way of example to the accompanying drawings in which.

DETAILED DESCRIPTION OF PREFERRED EMBODIMENTS

In a computer game, it may be desirable for a kinetic activity such as an explosion to behave in a certain manner in order to improve realism. For example, it may be required to emit particles through cracks or openings in a building without having to incur the processing cost of calculating where the particles strike intersecting walls. Using existing techniques, this would involve a very complex and time-consuming process.

Instead, according to a preferred embodiment of the present invention, a non-visual texture map is generated with the variations in texture defining variations in a value of particle speed over a surface of a computer-modelled object. The texture map is applied to the surface of a computer-modelled object, such as a building 2 of FIG. 1a, within the game. When the explosion occurs (e.g. in response to some user stimulus provided from the user as part of the game), the texture map then defines the speed at which particles will be modelled to be emitted from that surface. That is to say, the non-visual texture map applied to the object's surface controls exactly where on that surface and with what speed the particle is emitted. The angle of each emitted particle may be constant or may be normal to the location on the surface from which it is emitted. Once the particle has been emitted at a certain velocity and angle, its subsequent behaviour will be taken over by the game's physics engine. The modelled emission of the particles is displayed on a screen over the display of the computer-modelled object.

Figure 1A:
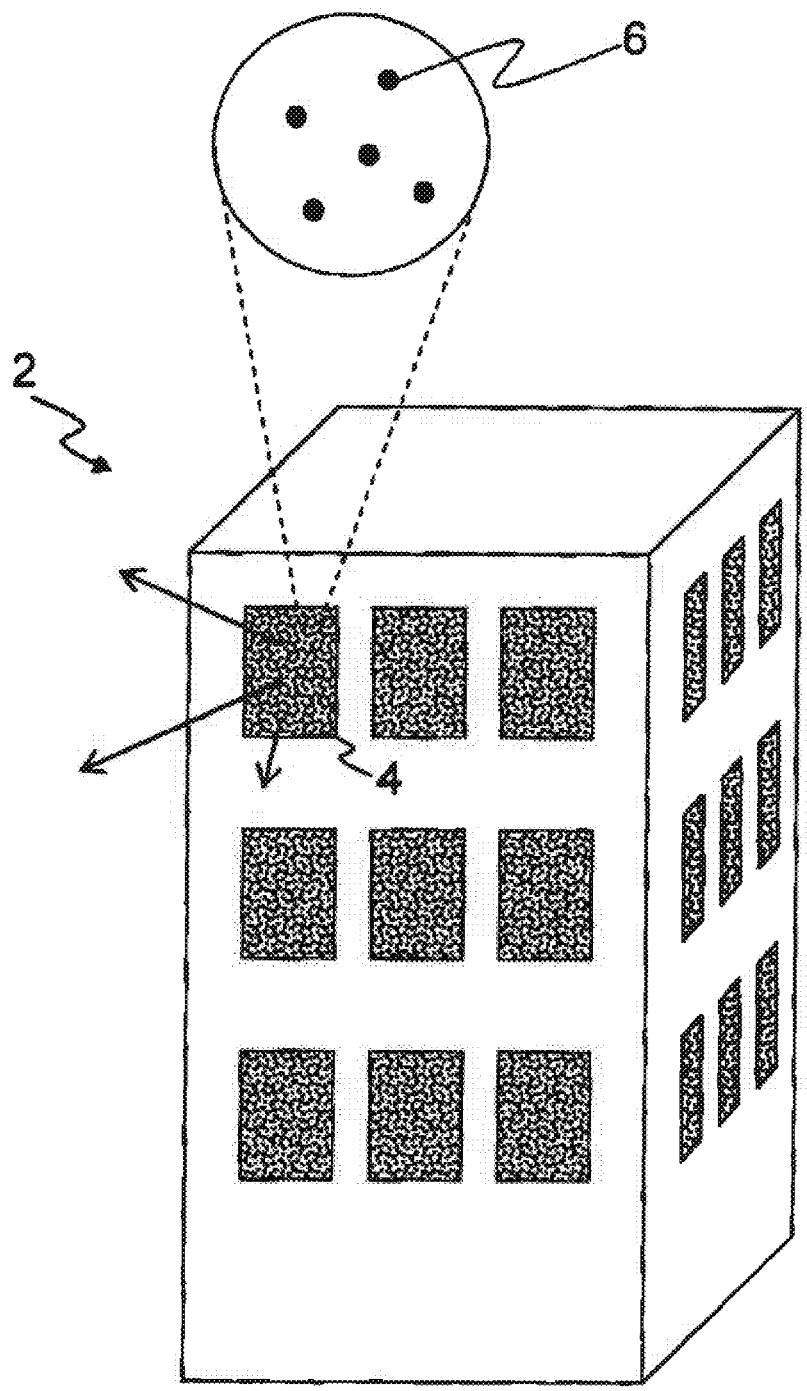
FIG. 1a is a schematic representation of an explosion modelled to occur within computer-modelled building.
Figure 1B:
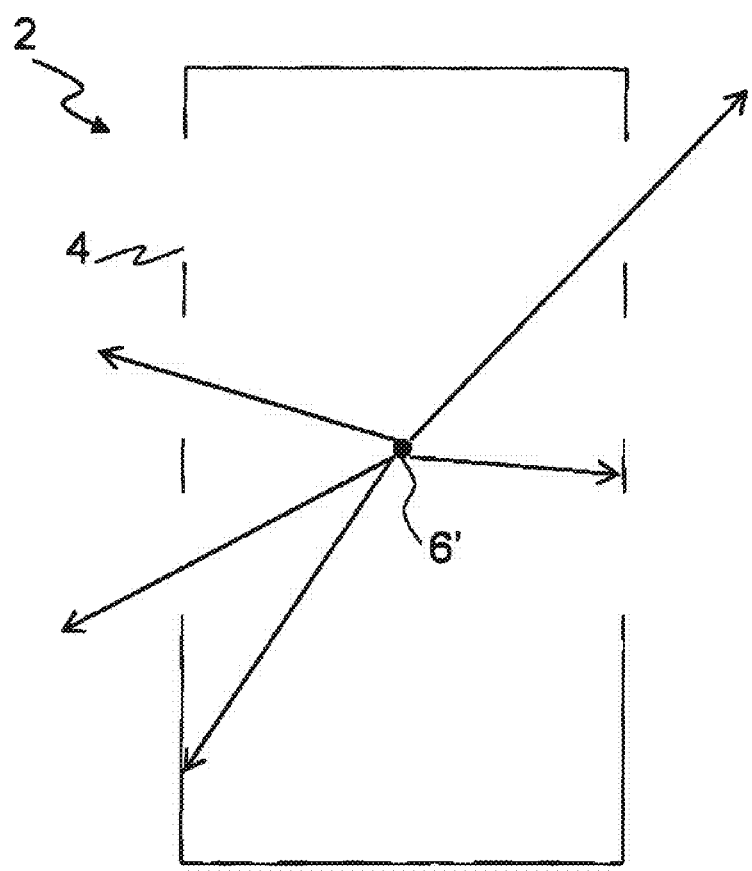
FIG. 1b is another schematic representation of an explosion modelled to occur within a computer-modelled building.

A difference between a texture map and simply a collection of discrete emitters such as discussed with reference to FIG. 1a is that the texture forms a continuous region in which the speed is defined over all points on a two-dimensional portion of an object's surface; whereas discrete emitters only define the speed at certain isolated, non-continuous points on the surface (albeit potentially a large number of points).

Preferably the texture is applied to the surface of an object by a process of UV mapping, whereby a three-dimensional object defined in three dimensional coordinates such as X, Y and Z is transformed into two-dimensional coordinates U and V. The details of UV mapping will be familiar to a person skilled in the art.

In a particularly preferred embodiment, the particle speed texture map is generated by re-using an existing, visual texture map which defines variations in a visual parameter such as shade over the surface in question. That is to say, an extra functional meaning is correlated onto the meaning of the visual parameter of the texture, so that the varying visual shades of the texture also control the emitted particles' speeds.

Figure 2A:
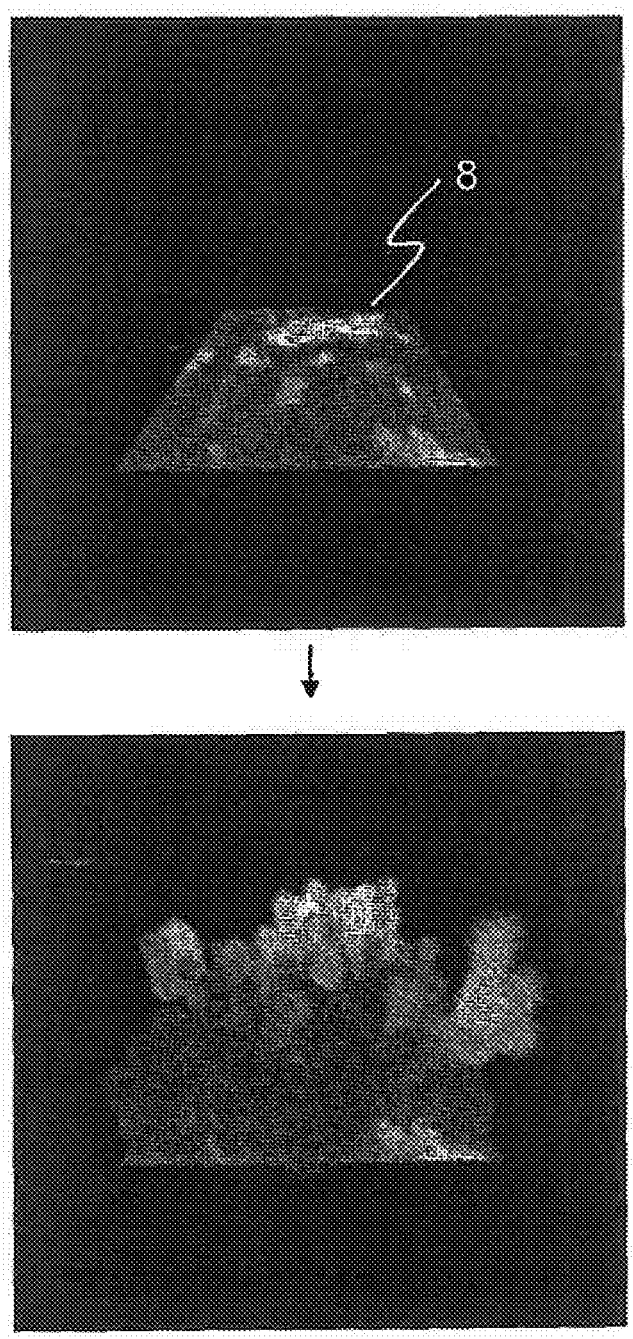
FIG. 2a shows an example of a particle emitting texture.

An example texture 8 is shown in FIG. 2a (top), along with a stage in its subsequent emission of particles (bottom). Here it can be seen that the regions of lighter shade correlate to faster particles (which therefore according to the game's physics travel further), whereas regions of darker shade correlate to slower particles (which therefore travel less).

Figure 2B:
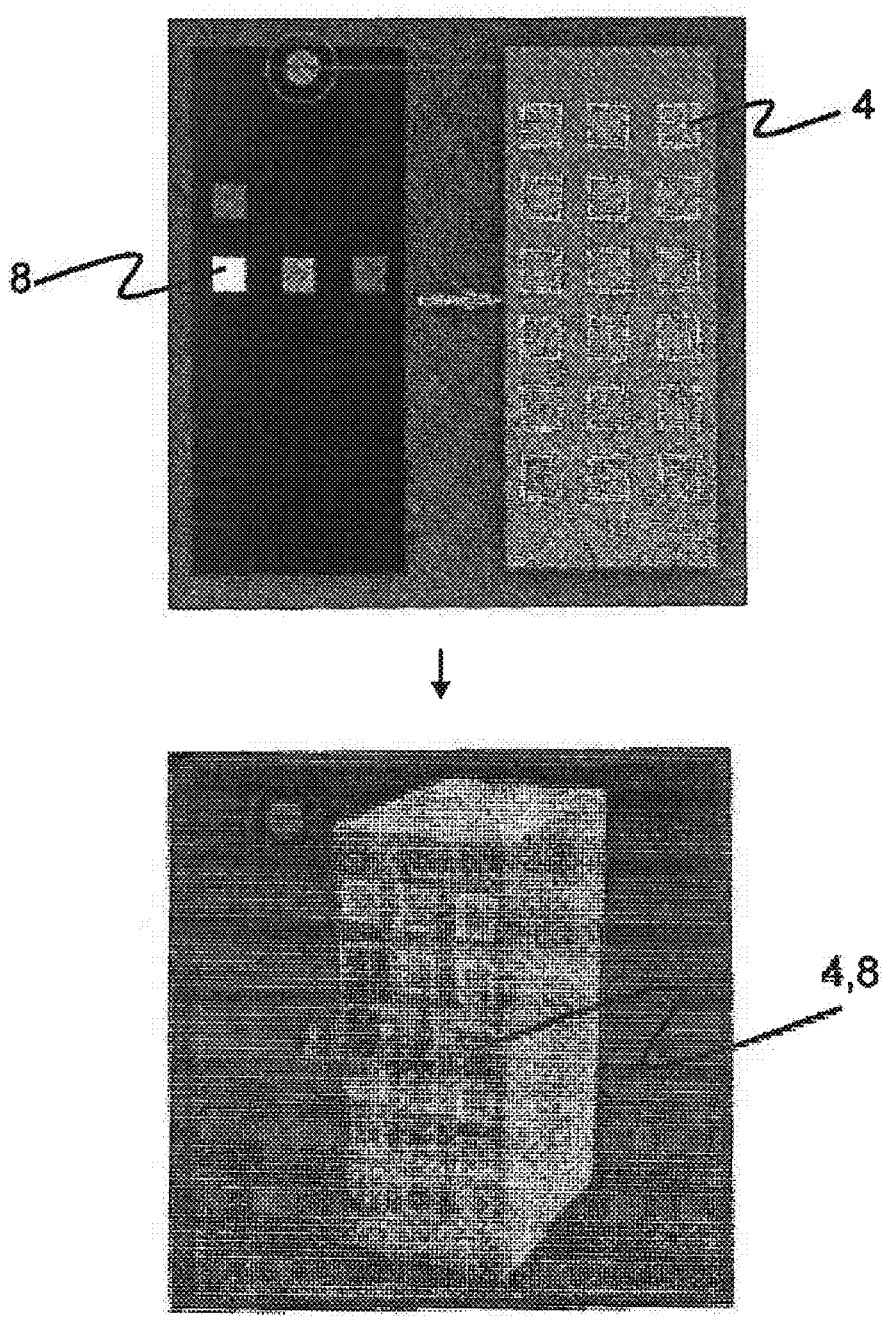
FIG. 2b shows an example of the texture of FIG. 2a applied to windows of a computer-modelled building in order to model an explosion.

As shown in FIG. 2b (top), the texture 8 is preferably applied to a plurality of windows 4 of the modelled building 2. When the explosion occurs, the texture 8 then defines the speed at which particles will be modelled to be emitted from the plurality of windows 4 of that building 2.

In addition or as an alternative to the visual map defining the variations in shade over the surface in question, the visual map may define variations in hue. For example, redder areas could emit faster particles whilst yellower areas emit slower particles.

Note that there are a number of different ways of parameterizing colour using coordinates in colour-space, each of which may have a specific terminology. However, the term "shade" as used herein is meant broadly to refer to any kind of perceived brightness or intensity of a given hue, and hue is used to mean variations in the actual red-green-blue combination of the colour or such like.

Note also that in computer games, visual textures may often be applied to surfaces in layers. This means that a visual texture at a lower layer may not always be visible within the game, but may only become visible or partially visible in dependence on some condition or event within the game.

The texture may be either artist generated, i.e. created manually using a computer implemented drawing or design product; or may be a procedural texture, i.e. created automatically by a mathematical procedure. The texture could also be a combination of the two.

In alternative embodiments, the visual texture may be used to control other properties of emitted particles. One example could be the particles' lifetimes, e.g. such that particles emitted from a brighter or redder area could exist for longer in the game world after their emission than particles emitted from darker or yellower areas. Another example could be the density or frequency of emitted particles or the probability of a particle being emitted.

The above has been described using the example of an explosion from a building. However, the technique can be applied to any computer-modelled object such as a vehicle or computer game character. For example, an explosion through the windows of a car could be modelled by applying particle-emitting textures to its windows. In another example, the dirt system in a driving game may progressively build up layers of textures to depict dirt on a vehicle. The same textures could then be used to correlate the areas of dirt to the emission of dirt particles, e.g. by correlating the darkness of the dirt to the density or speed of dirt particles emitted therefrom. There is no way that this could be done accurately and convincingly enough using standard, discrete emitters 6.

In further embodiments, the visual texture could be used to control kinetic properties of other types of activity occurring in relation to an object's surface. An activity is not just a static property of the surface, but something dynamic, i.e. a property that changes over time; and furthermore is kinetic, i.e. relates to motion within the computer-modelled space.

One such example could be a material property of the surface defining how that surface reacts to impacts modelled to occur within the computer-modelled environment, e.g. by breaking or deforming. For example, a car may be modelled to be made of different materials at different locations on its surface, each having a different material property such as its strength. Further, within a region of a given material, different locations could have a different material property, e.g. due to weakening caused by previous impacts already having occurred within the computer-modelled environment. Using standard techniques to model this, the varying strengths would have to be separately defined over the whole model. However, this burden may be reduced using the technique of the present invention by correlating a visual texture map of the surface to a material property. For example, it may be specified that grey regions correspond to metal whilst transparent regions correspond to glass, which will affect how the surface at those regions reacts to impacts since the metal may deform whilst the glass shatters. Or in another example, it may be specified that darker regions of metal have already been weakened by previous impacts and so will be more deformed or more likely to become detached than lighter regions.

Figure 3:
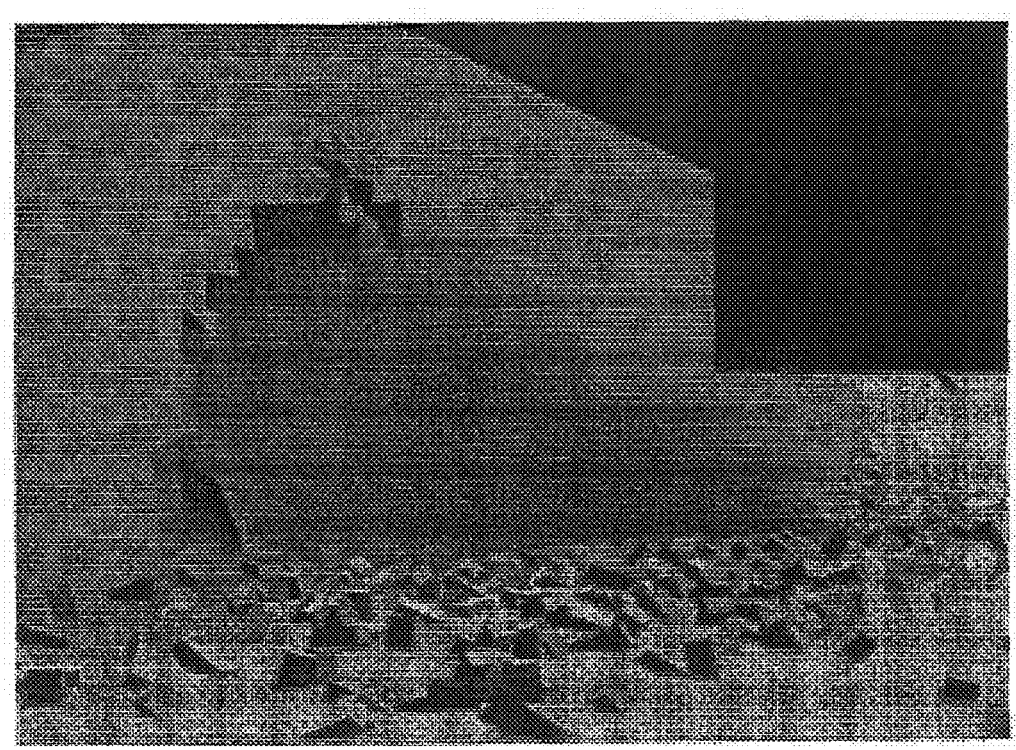
FIG. 3 is an illustration of a wall modelled to have a hole blown through it.

In yet further embodiments, textures can be used to model geometry. For example, consider a wall that has a hole made in it, as illustrated in FIG. 3. Using existing techniques, the three-dimensional geometry of the wall would have to be manually edited to model the thickness of the wall around the sides of hole. However, according to one further application of the present invention, the hole need not actually affect the geometry. Instead, a two-dimensional alpha mask texture can be plotted to represent the hole and emitting particles from that same texture. This of course is not enough as the end-user will need to see the thickness of the walls around the edges of the hole, and also if there is an interior behind the wall then the user would expect to see that. Therefore, at the same time as the texture is plotted down and the particles emitted, a mesh representing the thickness of the wall and anything that may be behind it is also placed down. Using this technique, a lot of processes can be reduced down and done at once, and this also saves on polygon count.

Various aspects of the various described arrangements may be combined, no described arrangement being limited to a stand-alone arrangement. In a preferred implementation, all described arrangements are implemented together. Various additional modifications and variations to the invention and its described embodiments will be apparent to one skilled in the art. All deviations from the specific teachings of this specification that rely upon the principles and their equivalents through which the art has been advanced are within the scope of the invention as described and claimed.

The techniques described are readily applicable to interactive game settings in which a player moves a user-controlled character (avatar) through a virtual game world, interacts with game (or other user) controlled characters (avatars) or objects, including responding to the interaction by selecting particular behaviors or actions for their user-controlled characters, and views the actions of the game controlled characters as they respond to these behaviors or actions.

An embodiment of the invention may include a video game device capable of executing a video game program that incorporates the applications in arrangements discussed above. While such an interactive game program can be executed under any computer system capable of communicating with other devices, the following description is directed to an interactive game program being executed by an interactive game device (e.g., a particular example of an information processing device or computing device) which may be a standalone device for one or more users or a device capable of communicating with other devices. The invention is not limited to use to a particular interactive game device, but it may be implemented with any interactive game device capable of executing an interactive game program according to the present invention, such as a portable interactive game device, an interactive game device adapted for use with a television or other monitor, a computer such as a desktop, laptop, notebook, or other computer, a telephone such as a cellular phone, or any other electronic device adapted for running an interactive game program including the animation methods of the invention.

Figure 4:
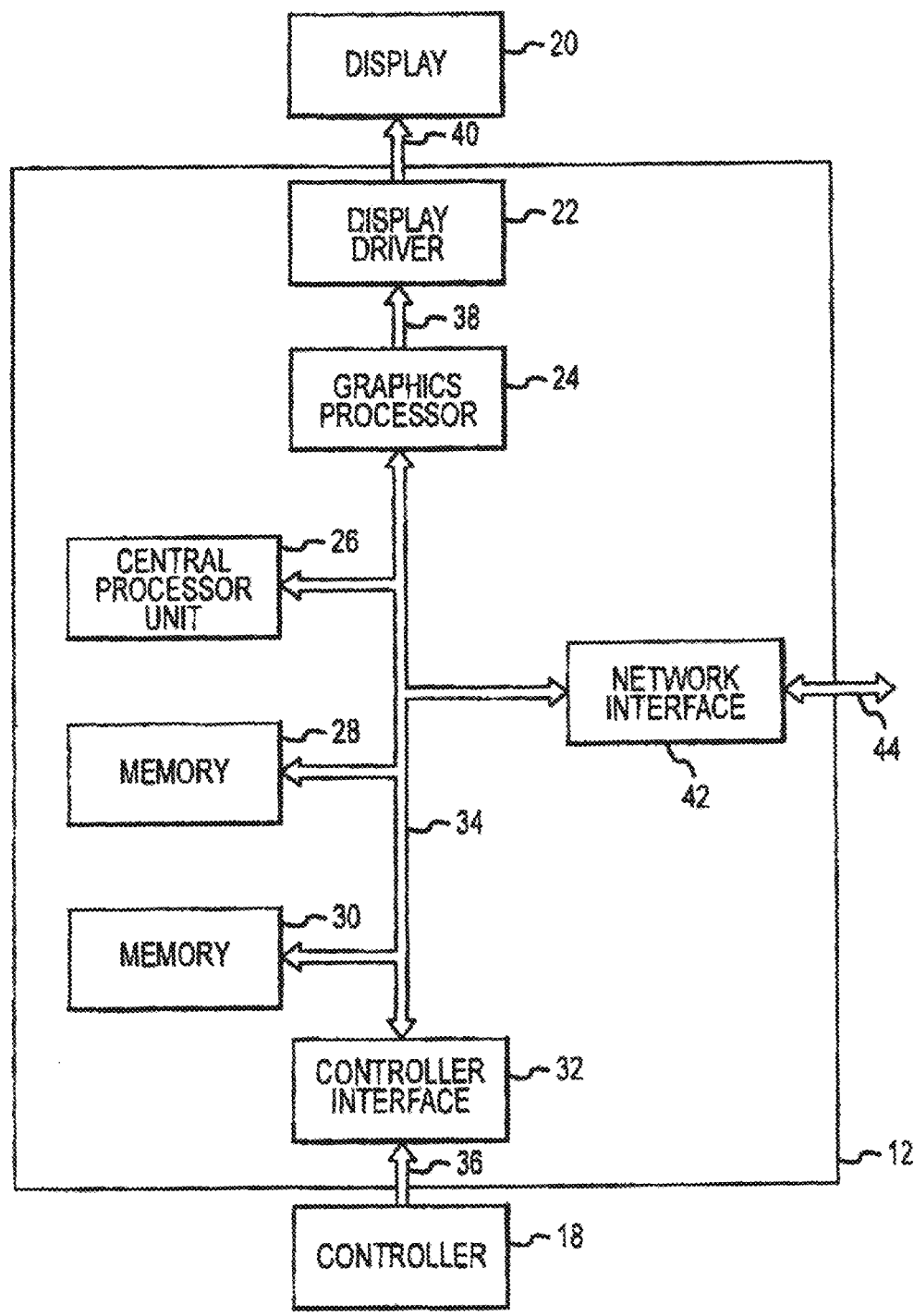
FIG. 4 illustrates the main functional elements of an exemplary computer games console as known in the art.

An example interactive game device or system is shown in FIG. 4, and denoted by reference numeral 12. The device includes a graphics processor 24 controlling a display driver 22 via a graphics bus 38, a controller interface 32 receiving controller data on a controller interface bus 36, a central processor unit (CPU) 26, a network interface 42 connected to a network bus 44, and memory modules 28 and 30. A system bus 34 connects various elements. The display driver 22 drives the display 20 via display bus 40.

The example interactive game device of the invention may include one or more monitors on which graphics may be displayed such as one or more LCDs (Liquid Crystal Display) and such a display or monitor may be provided within the game housing or as a separate monitor (such as a television). While LCDs are one preferred embodiment, the monitor or display device may be of any other suitable type, e.g., an EL (Electro Luminescence) display device. Moreover, the resolution of the monitor or display device is not limited to the particular resolution used herein. One or more speakers allowing game sounds to pass through may also be provided as part of the interactive game device or external speakers may be used such as provided in a television or attached to the game device. The interactive game device may include user input or interface devices such as a set of input devices that may include typical video game input devices such as a cross-shaped switch, a start switch, a select switch, an A button, a B button, an X button, a Y button, a power switch, a left or L button, a right or R button, and the like such as a touch screen or peripherals such as a joystick. Another input device is a touch panel or screen attached on the screen of a second LCD. The housing in many embodiments includes slots for accommodating a memory card (e.g., a game cartridge). The memory card or game cartridge is a storage medium storing the interactive game program run by the interactive game device and, typically, for storing the animations described herein. In other embodiments, though, the interactive game program(s) and graphics may be accessed via a communications network such as the Internet (as described herein).

In implementations in which the video game device is a portable device or is a device that is linked to a television or other monitor/speaker system, the internal configuration of the video game device may include a CPU 26 mounted on an electronic circuit board positioned in the game housing. The CPU 26 may be connected to an input/output interface circuit, one or more GPU (Graphics Processing Unit) 24 and a monitor controller as display driver 22 such as via bus 34. A connector or memory interface may be provided for receiving a memory card, which may include ROM storing the video game program including the animations and RAM such as for rewritably storing backup data. The video game program stored in the ROM of the memory card is typically loaded to the RAM, and the loaded video game program is executed by the CPU during operation of the video game device. In addition to the video game program, the RAM also stores temporary, data produced while the CPU is running a program. The input/output circuit may be connected to the user inputs or control switch section (e.g., user interface) and monitor. Video RAM or VRAM may be used to provide storage of animations or images rendered according to the invention and may be stored in RAM prior to display by the GPU or other graphics controllers. Memory blocks 28 and 30 connected to bus 34 represent different possible types of memory.

As will be clear to those skilled in the arts, numerous embodiments of interactive game apparatus and interactive game controllers may be used to practice the present invention, e.g., to run the methods described herein as part of an interactive video game program stored on storage medium such as memory card, game cartridge, or the like, and the above description of an interactive game device is not intended to limit the breadth of coverage. For example, the interactive game program may be stored on a disk (e.g., a CD or other data storage media) and downloaded into a computer's memory to be run or run from disk. Alternatively, the game program and its animations may be accessed by using an electronic device to access a Web site or to access (in a wired or wireless manner) memory over a digital communications network such as the Internet and the interactive game may be run remotely or after storage on local memory.

It will be appreciated that the embodiments herein are described only by way of example. The scope of the invention is not limited by the described embodiments, but only by the following claims.

What is claimed is:

1. A computer program product stored in a non-transitory storage device comprising code which when executed on a computer will:
   generate a computer-modeled environment comprising a three-dimensional computer-modeled space and one or more three-dimensional computer-modeled objects within said space;
   generate a visual texture map for application to a surface of one of said computer-modeled objects, the visual texture map defining differing values of a visual parameter over said surface; and
   generate a kinetic map using the visual texture map including applying the visual texture map to the surface and further including defining values of a kinetic parameter based on the values of said visual parameter at corresponding locations over said surface, the kinetic parameter parameterising a kinetic activity to be modelled to occur within said computer-modeled space in relation to said surface.

2. The product of claim 1, wherein the kinetic parameter parameterises an emission of particles from the respective locations of said surface.

3. The product of claim 2, wherein the kinetic parameter specifies speeds of the particles modeled as being emitted from the respective locations of said surface.

4. The product of claim 2, wherein the kinetic parameter specifies a lifetime of a particle to be ejected from said surface.

5. The product of claim 2, wherein the kinetic parameter specifies one of the density, the frequency and the probability of a particle being ejected from said surface.

6. The product of claim 2, wherein said particles model an explosion emitted from or through said surface.

7. The product of claim 2, wherein said particles model smoke emitted from or through said surface.

8. The product of claim 2, wherein said particles model dirt emitted from said surface.

9. The product of claim 1, wherein the kinetic parameter is a modeled material property of said surface, the material property parameterising how said surface will react to impacts occurring within said computer modeled environment at the respective locations of said surface.

10. The product of claim 1, wherein the visual parameter parameterises variations in shade over said surface.

11. The product of claim wherein the visual parameter parameterises variations in hue over said surface.

12. The product of claim 1, wherein the computer program product comprises a computer game product such that said computer-modeled environment comprises a game world, and said code further comprises game logic which when executed will trigger said kinetic activity in dependence on a user input received from a user in relation to the game.

13. The product of claim 12, wherein said object comprises a building.

14. The product of claim 12, wherein said object comprises a vehicle.

15. The product of claim 12 wherein said object comprises a game character.

16. A computer program product stored in a non-transitory storage device comprising code which when executed on a computer will:
   generate a computer-modeled environment comprising a three-dimensional computer-modeled space and one or more three-dimensional computer-modeled objects within said space;

generate a visual texture map for application to a surface of one of said computer-modeled objects, the visual texture map defining differing values of a visual parameter over said surface; and generate a particle-speed map by correlating values of particle speed to the values of said visual parameter at corresponding locations over said surface, the particle speed values specifying the speed of particles modelled to be ejected from the respective locations of said surface within said computer-modeled space and the visual texture map forms a continuous region for at least a portion of the surface whereby the particle speed values are defined for points of the continuous region of the surface.

17. A computer program product stored in a non-transitory storage device comprising code which when executed on a computer will:

generate a computer modeled environment comprising a three-dimensional computer-modeled space and one or more computer three-dimensional computer-modeled objects; and generate a non-visual texture map mapping a speed value over a continuous portion of a surface of one of said computer-modeled object, the speed value specifying the speed of emitted particles by defining the speed value at a number of locations of the continuous portion of the surface using visual parameter values at the locations.

18. The product of claim 17, wherein the texture map is a procedural texture map.

19. The product of claim 17, wherein the texture map is an artist-generated texture map.

20. A method performed by a computer system comprising:

generating a computer-modeled environment comprising a three-dimensional computer-modeled space and one or more three-dimensional computer-modeled objects within said space;

generating a visual texture map for application to a surface of one of said computer-modeled objects, the visual texture map defining differing values of a visual parameter over said surface; and generating a kinetic map by correlating values of a kinetic parameter to the values of said visual parameter at corresponding locations over said surface, the kinetic parameter parameterising a kinetic activity to be modeled to occur within said computer-modelled space in relation to said surface.

21. The method of claim 20, wherein the kinetic parameter parameterises an emission of particles from the respective locations of said surface.

22. The method of claim 21, wherein the kinetic parameter specifies speeds of the particles modeled as being emitted from the respective locations of said surface.

23. The method of claim 21, wherein the kinetic parameter specifies a lifetime of a particle to be ejected from said surface.

24. The method of claim 21, wherein the kinetic parameter specifies one of the density, the frequency and the probability of a particle being ejected from said surface.

25. The method of claim 21, wherein said particles model an explosion emitted from or through said surface.

26. The method of claim 21, wherein said particles model smoke emitted from or through said surface.

27. The method of claim 21, wherein said particles model dirt emitted from said surface.

28. The method of claim 20, wherein the kinetic parameter is a modeled material property of said surface, the material property parameterising how said surface will react to impacts occurring within said computer modeled environment at the respective locations of said surface.

29. The method of claim 20, wherein the visual parameter parameterises variations in shade over said surface.

30. The method of claim 20, wherein the visual parameter parameterises variations in hue over said surface.

31. The method of claim 20, wherein the computer program product comprises a computer game product such that said computer-modeled environment comprises a game world, and said code further comprises game logic which when executed will trigger said kinetic activity in dependence on a user input received from a user in relation to the game.

32. The method of claim 31, wherein said object comprises a building.

33. The method of claim 31, wherein said object comprises a vehicle.

34. The method of claim 31, wherein said object comprises a game character.

35. A method performed by a computer system comprising;

generating a computer-modelled environment comprising a three-dimensional computer-modeled space and one or more three-dimensional computer-modeled objects within said space;

generating a visual texture map for application to a surface of one of said computer-modeled objects, the visual texture map defining differing values of a visual parameter over said surface; and generating a particle-speed map by correlating values of particle speed to the values of said visual parameter at corresponding locations over said surface, the particle speed values specifying the speed of particles modeled to be ejected from the respective locations of said surface within said computer-modeled space and the visual texture map forms a continuous region for at least a portion of the surface whereby the particle speed values are defined for points of the continuous region of the surface.

36. A method performed by a computer system comprising:

generating a computer modelled environment comprising a three-dimensional computer-modeled space and one or more computer three-dimensional computer-modeled objects; and generating a non-visual texture map mapping a speed value over a continuous portion of a surface of one of said computer-modeled object, the speed value specifying the speed of emitted particles by defining the speed value at a number of locations of the continuous portion of the surface using visual parameter values at the locations.

37. The method of claim 36, wherein the texture map is a procedural texture map.

38. The method of claim 6, wherein the texture map is an artist-generated texture map.

* * * * *